(12) United States Patent
Pursifull et al.

(10) Patent No.: US 11,987,234 B2
(45) Date of Patent: May 21, 2024

(54) ADAPTABLE ORIENTATION OPTIMIZATION FOR VEHICLES WITH SOLAR PHOTOVOLTAIC SURFACES

(71) Applicant: FORD GLOBAL TECHNOLOGIES, LLC, Dearborn, MI (US)

(72) Inventors: Ross Dykstra Pursifull, Dearborn, MI (US); Yeo-Wang John Lee, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 17/834,233

(22) Filed: Jun. 7, 2022

(65) Prior Publication Data
US 2023/0391318 A1 Dec. 7, 2023

(51) Int. Cl.
| | |
|---|---|
| H02S 10/40 | (2014.01) |
| B60W 30/06 | (2006.01) |
| B60W 40/02 | (2006.01) |
| G05D 1/00 | (2006.01) |
| H02S 20/32 | (2014.01) |

(52) U.S. Cl.
CPC ............ *B60W 30/06* (2013.01); *B60W 40/02* (2013.01); *G05D 1/0011* (2013.01); *G05D 1/0088* (2013.01); *G05D 1/0278* (2013.01); *H02S 10/40* (2014.12); *H02S 20/32* (2014.12); *B60W 2555/20* (2020.02); *B60W 2556/50* (2020.02)

(58) Field of Classification Search
None
See application file for complete search history.

(56) References Cited

U.S. PATENT DOCUMENTS

| | | | | |
|---|---|---|---|---|
| 4,660,879 | A * | 4/1987 | Kobayashi | B62D 35/007 180/2.2 |
| 4,799,629 | A * | 1/1989 | Mori | F21S 11/00 244/30 |
| 6,371,409 | B1 * | 4/2002 | Steele | B64B 1/14 244/30 |
| 8,851,560 | B1 | 10/2014 | Freeman | |
| 8,884,784 | B2 | 11/2014 | Kirsch | |

(Continued)

FOREIGN PATENT DOCUMENTS

DE 102021002223 A1 6/2021

*Primary Examiner* — John F Mortell
(74) *Attorney, Agent, or Firm* — Frank L. Lollo; MacMillan, Sobanski & Todd, LLC (57) ABSTRACT

Solar power generation panels added on a transportation vehicle have a layout wherein power output of the panels varies according to an azimuth orientation of the vehicle. A controller includes a database of calibration curves relating an expected power output to a respective range of the azimuth orientation according to different solar altitude angles. A self-learning sequence is performed which (a) collects a magnitude of power output while the vehicle traverses the respective range of the azimuth orientation, (b) identifies a current solar altitude angle, and (c) stores a resulting calibration curve. A parking sequence comprises (a) selecting a calibration curve according to solar altitude angle, (b) determining a target vehicle azimuth angle which optimizes a cumulative power output based on the calibration curve and solar azimuth, and (d) initiating a movement of the vehicle to orient it at the target vehicle azimuth angle.

18 Claims, 5 Drawing Sheets

(56) References Cited

U.S. PATENT DOCUMENTS

| | | |
|---|---|---|
| 8,933,660 B2 | 1/2015 | Heumann et al. |
| 2014/0297072 A1 | 10/2014 | Freeman |
| 2019/0105992 A1* | 4/2019 | Bucknell ................. B60L 8/003 |
| 2021/0323605 A1 | 10/2021 | Cencula |

* cited by examiner

ADAPTABLE ORIENTATION OPTIMIZATION FOR VEHICLES WITH SOLAR PHOTOVOLTAIC SURFACES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to solar power generation on transportation vehicles, and, more specifically, to maximizing power generation during vehicle parking events by orienting solar panels to receive optimal illumination.

Solar power generation systems using solar panels (e.g., photovoltaic arrays) have received increasing attention in the automotive industry due to their dropping price and improved efficiency levels now available. The solar panels can be attached to a vehicle roof (e.g., as a replacement of a moon-roof or sun-roof), attached to other body surfaces, or used as a tonneau cover over a bed of a pickup truck, for example. Electricity generated by the panels can be used to charge an onboard battery (such as an auxiliary battery, an electric vehicle's high voltage battery, or the main 12V battery of a gasoline-powered or hybrid vehicle) or to directly power various electrical loads such as a heating, ventilation, air conditioning (HVAC) system. The solar power system may include a charge controller between the solar panels and the load to ensure that a maximum amount of power is transferred (e.g., to a battery being charged).

When a vehicle is parked outside during daylight conditions, the amount of power harvested by solar panels on the vehicle may typically be affected by many different factors, including the orientation of the panels toward the Sun and/or the possible shading of solar panel surfaces by other vehicle structures (e.g., a solar panel located on a tonneau cover being shaded by the roof of the passenger cabin). When a solar generation apparatus is part of a basic vehicle design (e.g., installed according to a standard predetermined layout for the particular vehicle), then a control system for determining a desired orientation of the vehicle to maximize solar exposure of the solar panels can be preprogrammed to evaluate the geometry of the position of the Sun and the vehicle geometric shape and solar panel positions according to that layout. However, some solar panel layouts may be adjustable after installation, the performance of solar panels may change differentially over time, and solar power generation systems can be added to a vehicle after original manufacture (i.e., as aftermarket equipment) according to a customized or ad hoc layout. Thus, there may be situations where a vehicle controller detects that a solar power generation apparatus is present but lacks sufficient details about the solar panel configuration that would enable it to perform a geometric analysis that determines an optimal vehicle orientation during parking.

SUMMARY OF THE INVENTION

The invention optimizes the power output of a solar generating apparatus without geometric details about solar panel layout on a vehicle or the shapes of vehicle surfaces which could block solar radiation from the solar panels. A self-learning procedure is based on actual measured power output as a vehicle is repositioned at corresponding azimuth angles in order to compile a database of calibration curves derived without any reliance on a knowledge of the panel layout or geometric analysis of vehicle surfaces or blockages.

In one aspect of the invention, a solar power generation apparatus is mounted on a transportation vehicle with a layout such that at any particular solar altitude angle a power output of the solar power generation apparatus varies according to an azimuth orientation of the vehicle. A controller coupled to the solar power generation apparatus includes a database of calibration curves relating an expected power output to a respective range of the azimuth orientation each corresponding to a respective solar altitude angle. The controller is configured to perform a self-learning sequence and a parking sequence for a parking event. The self-learning sequence comprises (a) collecting a magnitude of the power output while the vehicle is driven in a path which traverses the respective range of the azimuth orientation, (b) identifying a current solar altitude angle, and (c) storing a resulting calibration curve in the database. The parking sequence comprises (a) selecting one of the calibration curves from the database according to the current solar altitude angle, (b) determining a target vehicle azimuth angle which optimizes a cumulative power output based on the selected calibration curve and a current solar azimuth, and (c) initiating a movement of the vehicle according to the target vehicle azimuth angle.

DETAILED DESCRIPTION OF PREFERRED EMBODIMENTS

In general, the invention allows solar panel surfaces to be deployed in any arbitrary layout/configuration on a vehicle. A self-learning procedure may be conducted whenever a daylight cloud coverage is sufficiently low (e.g., a direct solar illumination is present which results in a level of shadow-casting above a predetermined level). In other words, when objects are not casting detectable shadows, then the self-learning procedure would be unreliable and, therefore, is not performed. If the sunlight shadowing condition is greater than a threshold, then the vehicle may be taken to a shade-free area (e.g., a portion of a parking area)

and maneuvered in a circle. It would also be acceptable to do a 3-point turn or the like if the area is too small for driving in a circle, provided a sufficient range of azimuth orientations are included. Vehicle azimuth angle (i.e., heading) can be determined using a magnetic compass, GPS, camera, and/or inertial sensors. During the maneuver for performing a shade-free solar scan, an instantaneous solar power output is recorded along with a corresponding azimuth angle (i.e., heading) of the vehicle, preferably including 360° of azimuth rotation. By performing a full 360° pirouette at on time, a robust calibration curve can be obtained since all the data for a single curve can be collected with a very stable solar influx. The data reveals optimal azimuth angle data for the current solar altitude (elevation) angle, wherein the altitude angle can be looked up (e.g., from an ephemeris) using global position coordinates from a GPS device and local time or using data from a camera or other solar sensor.

The resulting calibration curve data can be used subsequently during parking events to position the vehicle in an optimal orientation whenever the Sun is at or near the same altitude angle. Additional calibration curves can be obtained at different times/dates when the Sun is at a different altitude angle in order to build up a library database of calibration curves. In addition, one or more calibration curves can be used to estimate or interpolate calibration curves for other solar altitude angles for which data has not been measured. In many situations, the use of just one calibration curve based on one measurement trial to define a target azimuth orientation for a parking event may achieve power outputs as high as 90% of the most optimal orientation. Based on a target azimuth angle of the vehicle (toward which the incoming solar radiation should be directed), the current solar azimuth angle and target azimuth angle can be combined to determine a vehicle heading which orients the solar panels toward the current solar position to maximize solar energy generation (i.e., the target vehicle azimuth angle is normalized according to the actual solar position).

For further maximization of power harvesting, an expected duration of time for which the vehicle will be parked can be factored into the determination of the optimal azimuth orientation. Thus, a cumulative power output gathered over the full parking event can be calculated for a range of azimuth orientations and the best one is selected (or a vehicle can be autonomously moved during a parking event).

Figure 1:
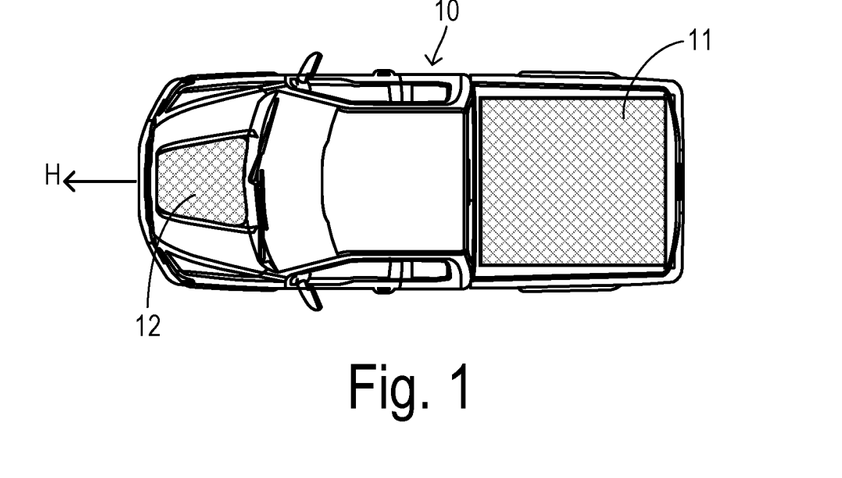
FIG. 1 is a top view of a light truck carrying a solar power generation apparatus with solar panels in a first configuration.

Referring to FIG. 1, a vehicle 10 is shown as a light pickup truck having a solar power generation apparatus including a solar panel 11 configured as a tonneau cover over a cargo area and a solar panel 12 integrated into a vehicle hood. Vehicle has a heading H. At any particular time while vehicle 10 is under solar illumination, the orientation of panels 11 and 12 toward the Sun and the potential shading of panels 11 or 12 by other portions of vehicle 10 will change as heading H changes.

Figure 2:
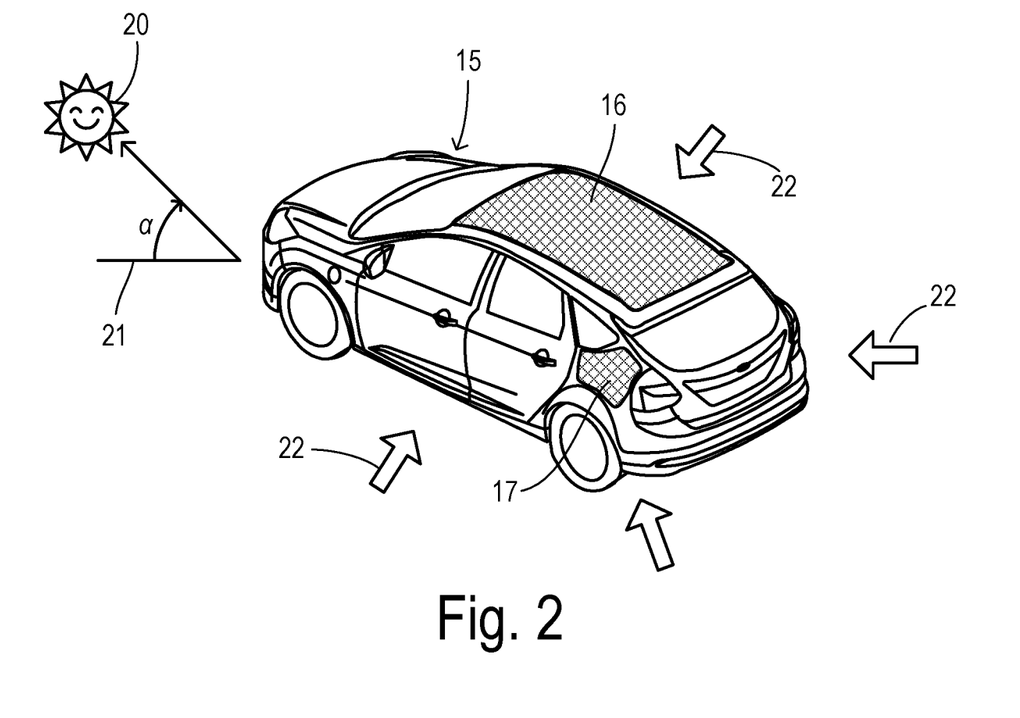
FIG. 2 is a perspective view of a sedan carrying a solar power generation apparatus with solar panels in a second configuration.

FIG. 2 shows another vehicle 15 in the form of a sedan with a roof-mounted solar panel 16 and a side-mounted solar panel 17. The solar panels in FIGS. 1 and 2 are examples of arbitrary placements which could be retro-fitted to vehicles at any time and in any desired layout. Solar power generation from panels 16 and 17 likewise varies according to a heading of vehicle 15 relative to a current position of Sun 20. More specifically, Sun 20 is located at an altitude (i.e., elevation) angle $\alpha$ relative to a horizontal ground plane 21 on which vehicle 15 rests. Depending on an azimuth direction of the position of Sun 20 and the heading of vehicle 15, the direct solar illumination comes from an azimuth direction (shown as any of arrows 22) toward vehicle 15. Since altitude angle $\alpha$ changes very slowly, optimization of solar power output at any particular time depends on the azimuth orientation of vehicle 15 relative to Sun 20. In conventional control systems, a geometric layout of solar panels has been utilized to calculate a concentration of sunlight falling on the panels are different orientations to determine a desired parking position of the vehicle. However, the present invention uses a novel solar calibration analysis which is done without any knowledge of a geometric layout of the solar panels.

Figure 3:
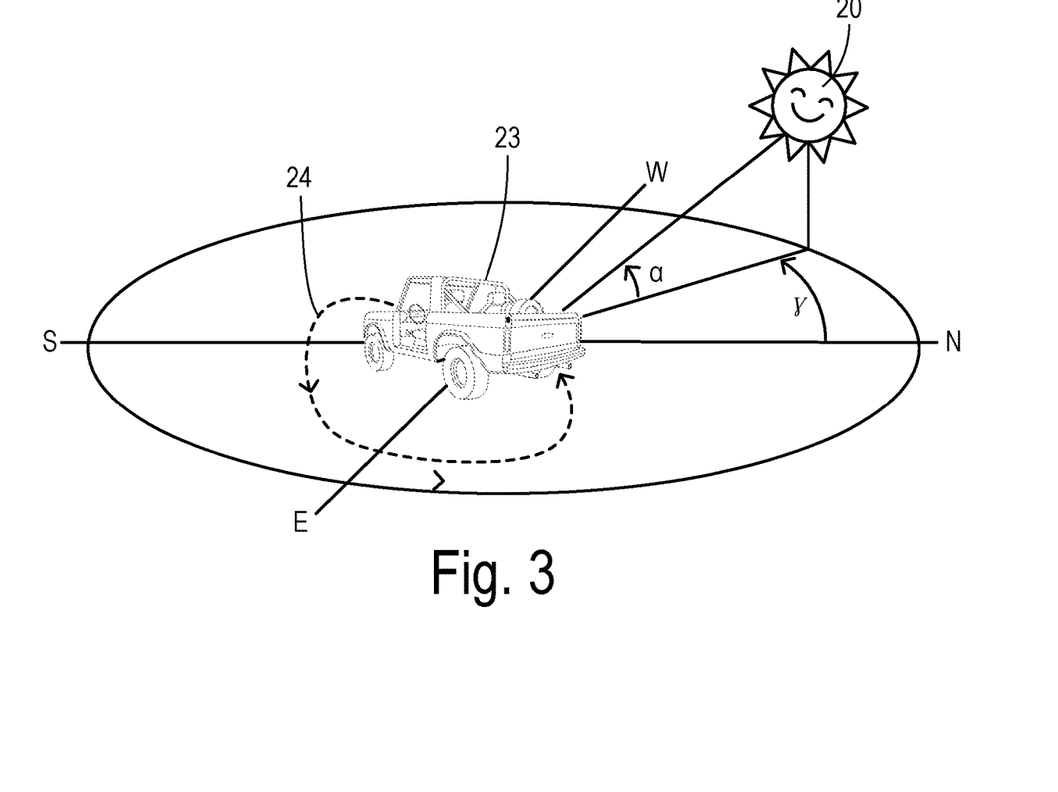
FIG. 3 is a schematic diagram illustrating solar azimuth and altitude angles and a vehicle azimuth angle together with a calibration path to be traversed by the vehicle.
Figure 4:
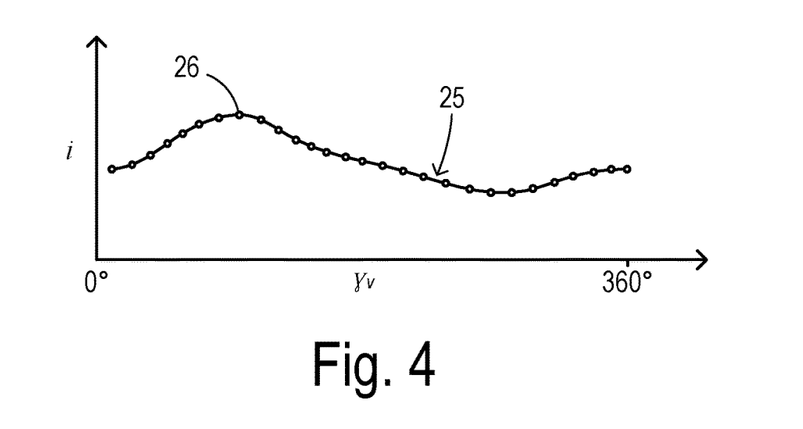
FIGS. 4 and 5 are calibration curves collected at respective solar altitude angles.
Figure 5:
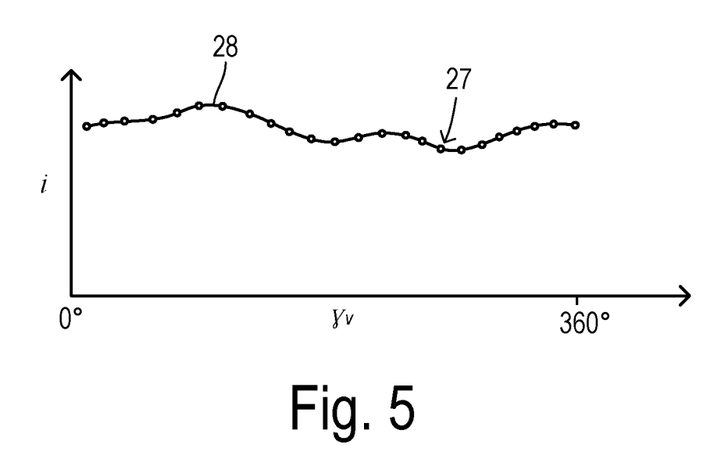

FIG. 3 shows a vehicle 23 receiving sunlight from Sun 20 which is at a position defined by solar altitude angle $\alpha$ and a solar azimuth angle $\gamma$. Solar azimuth angle $\gamma$ is defined relative to a fixed direction such as geographic north. In order to evaluate the power output of the particular layout of solar panels on vehicle 23 according to a changing azimuth direction toward Sun 20 while it is at a current altitude angle $\alpha$, a self-learning sequence is performed in which vehicle 23 is driven in a path 24 so that its orientation traverses through a range of azimuth orientation (preferably a full 360° sweep by following a circular path 24). FIG. 4 shows a plot of the variation of power output i as measured at respective azimuth orientations (vehicle azimuth angles $\gamma v$). A maximum output 26 occurs at an orientation where the surface normal of the solar panels are most closely aligned towards Sun 20 and where a low proportion of the solar panels are shaded. Since driving along the path occurs at one time, the full 360° curve in FIG. 4 corresponds to a particular solar altitude angle $\alpha$. At a different time, Sun 20 may be at a different position in the sky with a different solar altitude angle $\alpha$. At this different time, the self-learning sequence can be performed again in order to generate a variation in output power shown in FIG. 5. A resulting 360° plot 27 has a maximum value 28. In general, changes in the power output are less dependent upon changes in altitude angle than in azimuth. Consequently, a self-learning sequence at one particular solar altitude angle may provide good results over a wide range of adjacent solar altitude angles. Therefore, a large number of trials at different solar altitudes is not likely to be needed. A small number of calibration curves from actual measurements can be sufficient, and can be supplemented by interpolating additional calibration curves between the corresponding solar altitude angles is desired.

Figure 6:
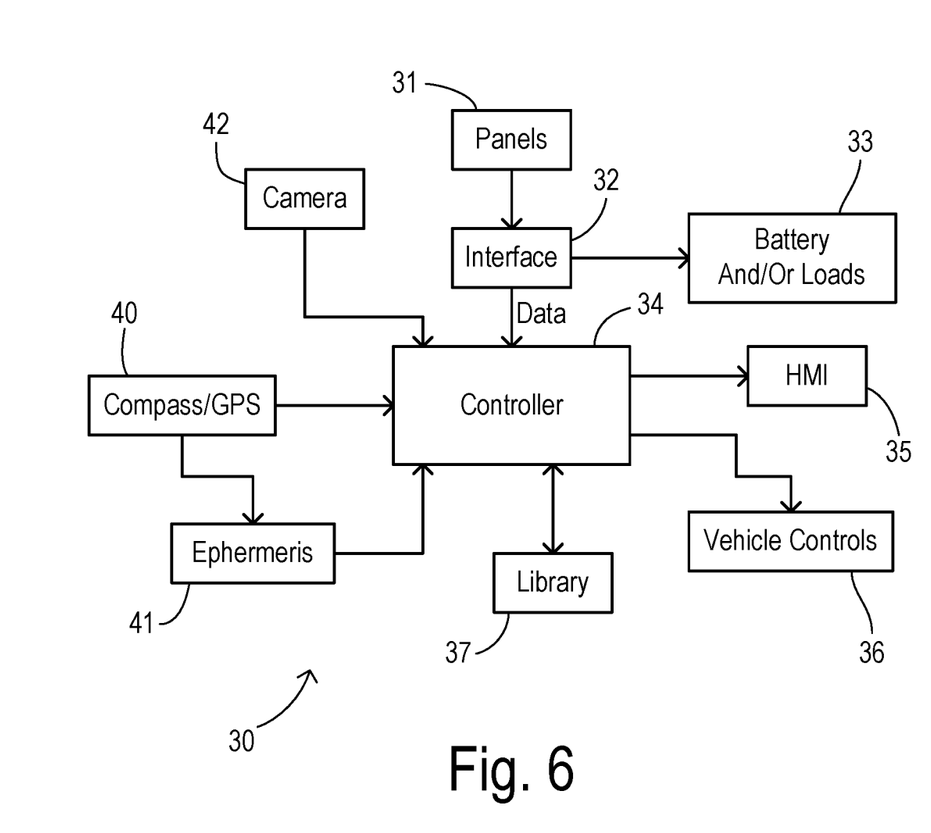
FIG. 6 is a block diagram showing a vehicle according to one preferred embodiment.

FIG. 6 shows one embodiment of a transportation vehicle 30 (e.g., car or truck) configured to optimize solar power generation during parking events. Vehicle has one or more solar panels 31 which can be mounted according to any arbitrary layout. Solar panels 31 are connected to an electrical interface 32 which delivers the generated power to a battery and/or electrical loads 33. Interface 32 also provides data representing the magnitude of the instantaneous power output from solar panels 31 to a controller 34. Controller 43 may be comprised of a programmable, general purpose processor or other type of control circuits. Controller 34 is coupled to a human-machine interface (HMI) 35 such as a touchscreen display panel or other interface elements as used in motor vehicles for receiving user inputs and for providing vehicle related data displays to a driver. HMI 35 may be used to instruct a driver to conduct a driving sequence in a circle or other path, to inform a driver of a desired parking orientation or parking spot, or to collect information from a driver such as an expected duration of a parking event. Controller 34 may also be coupled to vehicle controls 36 which may include an autonomous vehicle controller for automatically executing a calibration drive path or movement to a selected parking orientation or parking spot.

Controller 34 is connected to, or includes, a library 37 comprising a database of calibration curves each relating a power output to azimuth orientation, wherein each calibration curve applies to a respective solar altitude angle.

In order to monitor a vehicle orientation and/or location and a solar altitude/azimuth, controller 34 is coupled with a compass and/or GPS receiver 40, an ephemeris 41, and a camera 42. A magnetic compass and/or inertial sensors may be used in a known manner to identify an azimuth angle of a vehicle heading at all times. GPS receive 40 may provide geographic coordinates of a vehicle's location and the local time to be used with ephemeris 41 to determine a current solar altitude angle α and a current solar azimuth γ. Ephemeris 41 could alternatively be comprised of an off-board server accessed by a wireless data connection (not shown).

Controller 34 is configured to perform (1) a self-learning sequence to compile a database of calibration curves according to a solar panel layout of the vehicle, and (2) parking sequence for a parking event to place the vehicle in an orientation during the parking event which optimizes the total harvested power by the solar panels. For example, the self-learning sequence may collect a magnitude of the power output while the vehicle is driven in a path which traverses a range of the azimuth orientation, identify a current solar altitude angle, and store a resulting calibration curve in the database. The parking sequence may select one of the calibration curves from the database according to the current solar altitude angle, determine a target vehicle azimuth angle which optimizes a cumulative power output based on the selected calibration curve, an estimated duration of the parking event, and a current solar azimuth, and initiate a movement of the vehicle according to the target vehicle azimuth.

Figure 7:
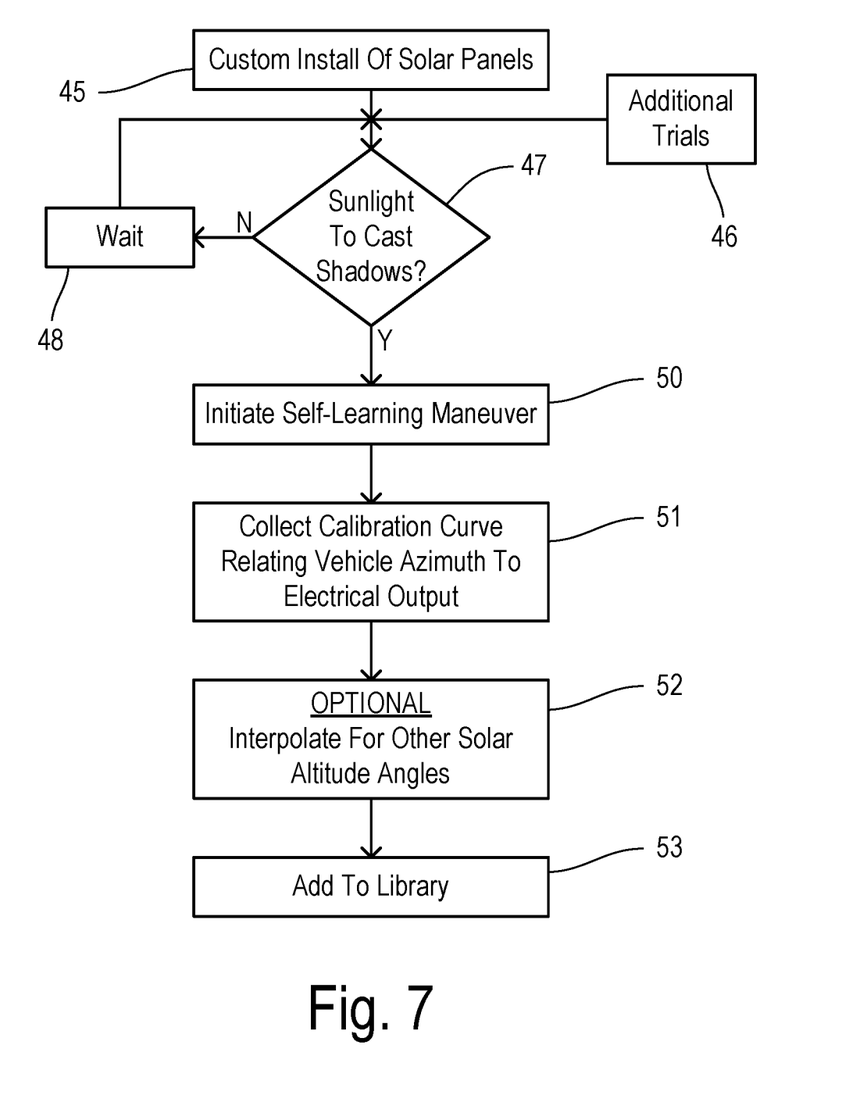
FIG. 7 is a flowchart showing a method of the invention including a self-learning procedure for adapting to customized layout of solar panels.

FIG. 7 shows a method including a self-learning procedure. A solar power generating apparatus is installed on the vehicle in step 45, including solar panels having a customized layout which results in a generated power output to an interface of the vehicle which varies according to an azimuth orientation of the vehicle (as compared to an azimuth angle of the Sun) and a solar altitude angle (elevation). Upon initial vehicle activation for driving after the solar panels have been installed, the self-learning procedure may be launched. The procedure may be repeatedly performed until a library of calibration curves is fully populated. Additional trials may be initiated at step 46 in response to a manual action by a driver or automatically when the library of calibration curves lacks a measurement trial corresponding to a current solar altitude angle, for example. When attempting to conduct a self-learning trial, a check is performed in step 47 to determine whether the brightness of direct sunlight is sufficiently high to obtain reliable measurements. Preferably, the check may be comprised of obtaining camera images of the vehicle surroundings to detect and evaluate shadows being cast by one or more objects in the sunlight. For example, a shadow being cast upon a ground surface may be detected in an image, and a brightness difference between the shadowed area and the surrounding ground surface is calculated from the image data to quantify a sunlight shadowing condition. If the difference is greater than a threshold, then the method may proceed to perform a self-learning maneuver in step 50. Otherwise, a waiting period occurs in step 48 until the sunlight shadowing condition improves.

In the self-learning maneuver of step 50, the driver can be instructed via an HMI to drive in a circular path or other path which sweeps the vehicle azimuth orientation across a range of orientations (preferably 360° of orientations). Alternatively, the vehicle can be autonomously driven in the desired path. While the path is executed, power output data for a calibration curve is collected in step 51 which relates the changing vehicle azimuth angle to the electrical power output. The vehicle azimuth angle is normalized according to the azimuth angle where the Sun is located during the trial. For example, the solar azimuth angle may be utilized as a zero degree reference (or any other angle reference) for the vehicle azimuth. Alternatively, the current solar azimuth angle can be transformed to a predetermined azimuth angle (e.g., 180°) while the vehicle azimuth angles are preserved to their true value, so that all the calibration curves have a common alignment and can be used in the same way when evaluating potential parking orientations. The resulting calibration curve is added to the library of calibration curves in step 53. Optionally, the newly derived calibration curve can also be used to interpolate calibration curves for other solar altitude angles in step 52, and the interpolated curves can be also added to the library in step 53.

Figure 8:
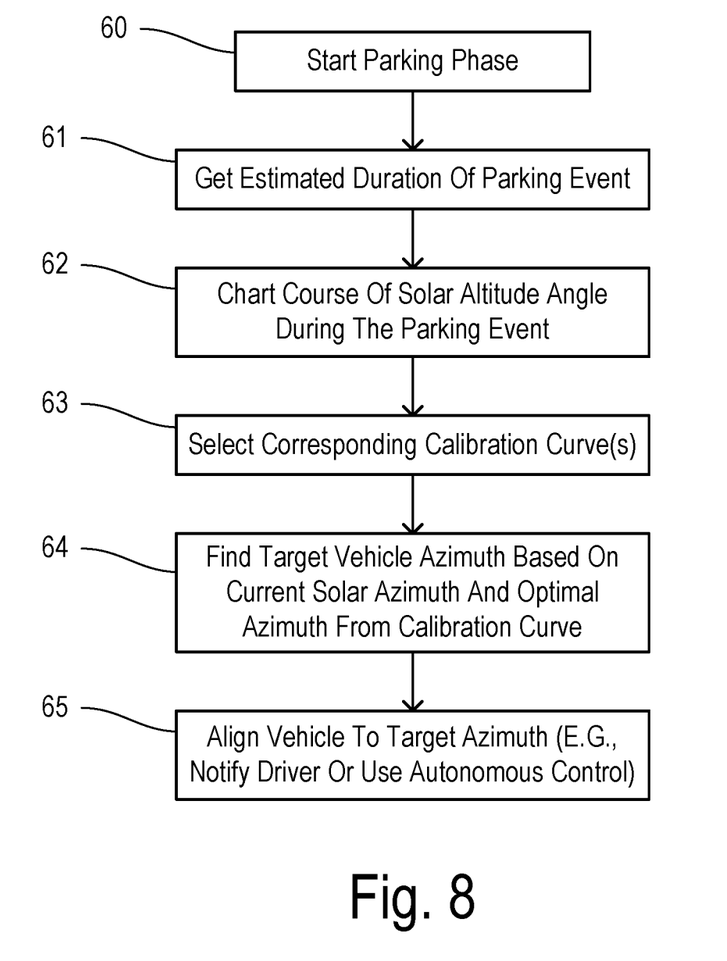
FIG. 8 is a flowchart showing a method of the invention including a parking procedure.

FIG. 8 shows a method including a parking procedure. A parking phase is initiated in step 60 in response to a manual indication by the driver or automatically based on detection of predetermined geographic coordinates corresponding to known parking venues (e.g., a parking lot at a place of work). An estimated duration of a parking event may be obtained in step 61. For example, the driver may input an expected duration using an HMI or the controller may estimate a parking duration based on the location of the vehicle (e.g., at work). A current solar altitude angle is determined in step 62. Especially for longer parking events, this may include charting a course of the solar altitude (and solar azimuth) during the parking event in order to identify an average or mean value for the current angle. Based on the current solar altitude angle, a corresponding calibration curve (or curves) may be selected in step 63. In step 64, the calibration curve(s) are used to find a target vehicle azimuth which optimizes the cumulative power output. Thus, the target vehicle azimuth may be based upon a current solar azimuth, a range of solar azimuth during the parking event, and/or the optimal portion(s) of the selected calibration curve. For example, a target vehicle azimuth may result in the solar azimuth coinciding with a peak in the calibration curve. A mathematical analysis for determining the target azimuth may include finding a maximization of the total power output associated with a plurality of test values for the vehicle azimuth applying the selected calibration curve(s).

Depending upon the manner in which the solar azimuth and/or vehicle azimuth are normalized, determining the target vehicle azimuth may be comprised of determining a rotation angle between the current solar azimuth and a reference vehicle direction, and combining the rotation angle with a calibration curve azimuth which optimizes the cumulative power output. Once the target vehicle azimuth angle is identified, the vehicle is aligned according to the target in step 65. Alignment can be manual (using an HMI to direct the driver) or automatic (using an autonomous vehicle controller).

What is claimed is:

1. A transportation vehicle, comprising:
   a solar power generation apparatus mounted on the vehicle with a layout such that at any particular solar altitude angle a power output of the solar power generation apparatus varies according to an azimuth orientation of the vehicle; and
   a controller coupled to the solar power generation apparatus, wherein the controller includes a database of calibration curves relating an expected power output to a respective range of the azimuth orientation each corresponding to a respective solar altitude angle, and wherein the controller is configured to:
perform a self-learning sequence comprising (a) collecting a magnitude of the power output while the vehicle is driven in a path which traverses the respective range of the azimuth orientation, (b) identifying a current solar altitude angle, and (c) storing a resulting calibration curve in the database; and
perform a parking sequence for a parking event, comprising (a) selecting one of the calibration curves from the database according to the current solar altitude angle, (b) determining a target vehicle azimuth angle which optimizes a cumulative power output based on the selected calibration curve and a current solar azimuth, and (c) initiating a movement of the vehicle according to the target vehicle azimuth angle.

2. The transportation vehicle of claim 1 wherein the parking sequence further comprises determining an estimated duration of the parking event, wherein determining the target vehicle azimuth angle which optimizes the cumulative power output is further based on the estimated duration.

3. The transportation vehicle of claim 2 further comprising:
a human machine interface;
wherein the estimated duration of the parking event is obtained in response to a user selection entered via the human machine interface.

4. The transportation vehicle of claim 1 further comprising:
a position source coupled to the controller providing a geographic location of the vehicle;
a time source coupled to the controller providing a current clock time and date;
wherein the controller determines the current solar altitude angle and the current solar azimuth using the geographic location and the current clock time and date.

5. The transportation vehicle of claim 4 wherein the position source and the time source are comprised of a global positioning system (GPS) receiver.

6. The transportation vehicle of claim 1 further comprising:
a human machine interface;
wherein the self-learning sequence is initiated by a user selection entered via the human machine interface.

7. The transportation vehicle of claim 1 wherein the self-learning sequence is conditioned upon detecting a sunlight shadowing condition greater than a threshold.

8. The transportation vehicle of claim 1 wherein determining the target vehicle azimuth angle is comprised of (i) determining a rotation angle between the current solar azimuth and a reference vehicle direction, and (ii) combining the rotation angle with a calibration curve azimuth which optimizes the cumulative power output.

9. The transportation vehicle of claim 1 further comprising:
a human machine interface;
wherein initiating the movement of the vehicle is comprised of displaying instructions to a driver for orienting the vehicle according to the target vehicle azimuth angle.

10. The transportation vehicle of claim 1 further comprising:
an advanced driver assistance system;
wherein initiating the movement of the vehicle is comprised of the advanced driver assistance system autonomously parking the vehicle according to the target vehicle azimuth angle.

11. A method for optimizing power output of a solar power generation apparatus on a transportation vehicle, wherein the solar power generation apparatus has a layout such that at any particular solar altitude angle the power output varies according to an azimuth orientation of the vehicle, the method comprising the steps of:
(A) performing a self-learning sequence comprising:
determining a current solar altitude angle;
collecting a magnitude of the power output while the vehicle is driven in a path which traverses a respective range of the azimuth orientation; and
storing a resulting calibration curve in a database; and
(B) performing a parking sequence for a parking event comprising:
determining a current solar altitude angle;
selecting one of the calibration curves from the database according to the current solar altitude angle;
determining a target vehicle azimuth angle which optimizes a cumulative power output based on the selected calibration curve;
determining a current solar azimuth; and
initiating a movement of the vehicle according to the current solar azimuth and the target vehicle azimuth angle.

12. The method of claim 11 wherein the steps of performing a parking sequence further comprises the step of:
determining an estimated duration of the parking event;
wherein determining the target vehicle azimuth angle which optimizes the cumulative power output is further based on the estimated duration.

13. The method of claim 12 wherein the estimated duration of the parking event is obtained in response to a user selection entered via a human machine interface.

14. The method of claim 11 further comprising the steps of:
detecting a sunlight shadowing condition; and
comparing the sunlight shadowing condition to a threshold;
wherein the self-learning sequence is performed only when the sunlight shadowing condition is greater than the threshold.

15. The method of claim 11 wherein the self-learning sequence is initiated by a user selection entered via a human machine interface.

16. The method of claim 11 wherein determining the target vehicle azimuth angle is comprised of (i) determining a rotation angle between the current solar azimuth and a reference vehicle direction, and (ii) combining the rotation angle with a calibration curve azimuth which optimizes the cumulative power output.

17. The method of claim 11 wherein initiating the movement of the vehicle is comprised of displaying instructions to a driver for orienting the vehicle according to the target vehicle azimuth angle.

18. The method of claim 11 wherein initiating the movement of the vehicle is comprised of an advanced driver assistance system autonomously parking the vehicle according to the target vehicle azimuth angle.

* * * * *